(12) United States Patent
Jacquet et al.

(10) Patent No.: US 8,363,551 B2
(45) Date of Patent: Jan. 29, 2013

(54) MEASURING NETWORK METRICS

(75) Inventors: Arnaud Jacquet, Ipswich (GB); Toby Moncaster, Colchester (GB)

(73) Assignee: British Telecommunications public limited company, London (GB)

( * ) Notice: Subject to any disclaimer, the term of this patent is extended or adjusted under 35 U.S.C. 154(b) by 314 days.

(21) Appl. No.: 12/922,912

(22) PCT Filed: Mar. 27, 2009

(86) PCT No.: PCT/GB2009/000828
§ 371 (c)(1),
(2), (4) Date: Sep. 16, 2010

(87) PCT Pub. No.: WO2009/118540
PCT Pub. Date: Oct. 1, 2009

(65) Prior Publication Data
US 2011/0182194 A1  Jul. 28, 2011

(30) Foreign Application Priority Data
Mar. 28, 2008 (EP) ..................................... 08251138

(51) Int. Cl.
*H04L 12/26* (2006.01)
(52) U.S. Cl. ...................................................... 370/236
(58) Field of Classification Search .................. None
See application file for complete search history.

(56) References Cited

U.S. PATENT DOCUMENTS

| | | | |
|---|---|---|---|
| 6,628,655 B1 * | 9/2003 | Fieschi et al. ................. | 370/389 |
| 6,724,881 B1 * | 4/2004 | McAllister et al. ....... | 379/220.01 |
| 7,710,902 B2 * | 5/2010 | Vasseur et al. ................ | 370/254 |
| 2007/0011284 A1 * | 1/2007 | Le Roux et al. .............. | 709/223 |
| 2007/0195698 A1 | 8/2007 | Briscoe | |
| 2007/0268827 A1 | 11/2007 | Csaszar | |
| 2008/0192636 A1 * | 8/2008 | Briscoe et al. ................ | 370/236 |
| 2008/0240115 A1 | 10/2008 | Briscoe | |
| 2009/0144443 A1 * | 6/2009 | Vasseur et al. ................ | 709/238 |
| 2011/0016209 A1 * | 1/2011 | Moncaster et al. ........... | 709/224 |

OTHER PUBLICATIONS

International Search Report for PCT/GB2009/000828, mailed Jun. 25, 2009.
Extended European Search Report (9 pgs.) dated Oct. 2, 2008 issued in European Application No. 08251138.7.

(Continued)

*Primary Examiner* — Raj Jain
(74) *Attorney, Agent, or Firm* — Nixon & Vanderhye P.C.

(57) ABSTRACT

Methods and systems for determining origin-specific network metrics in respect of a data network having at least one ingress node, the method comprising: receiving data items from outside the network; forwarding the data items with headers comprising fields for carrying origin information relating to the origin of the data item, and path metric information indicative of a characteristic being monitored; causing the data items to traverse the network; updating the fields carrying path metric information as the data items traverse the network; determining the origin information and path metric information after the data items have traversed the network and deriving in dependence thereon an origin-specific path metric relating to the characteristic in respect of the relevant portion of a path across the network; and combining origin-specific path metrics derived in respect of different data items if they relate to characteristics in respect of data items having a common origin. Also, methods and systems for determining target-specific network metrics in respect of a data network having at least one egress node.

18 Claims, 4 Drawing Sheets

OTHER PUBLICATIONS

Briscoe, B., Jacquet, A., Di Cairano-Gilfedder, C., Salvatori, A., Soppera, A., and Koyabe, M., *Policing Congestion Response in an Internetwork using Re-feedback*, SIGCOMM '05, Aug. 22-26, 2005, Philadelphia, PA, pp. 277-288.

Floyd, Sally and Jacobson, Van, *Random Early Detection Gateways for Congestion Avoidance*, Lawrence Berkeley Laboratory, University of California, Berkeley, CA, 1993, pp. 397-413.

Kuo, Fang-Chun and Fu, Xiaoming, *Probe-Aided MulTCP: An aggregate Congestion Control Mechanism*, ACM SIGCOMM Computer Communication Review, vol. 38, No. 1, Jan. 2008, pp. 17-28.

Balakrishnan, H., Rahul, H. S., and Seshan, S., *An Integrated Congestion Management Architecture for Internet Hosts*, M.I.T. Laboratory for Computer Science, Cambridge, MA and IBM T. J. Watson Research Center, Yorktown Heights, NY, SIGCOMM '99, pp. 175-187.

Singh, M., Pradhan, P., and Francis P., *MPAT: Aggregate TCP Congestion Management as a Building Block for Internet QoS*, Cornell University, IBM T. J. Watson Research Center, Proceedings of the 12$^{th}$ IEEE International Conference on Network Protocols (ICNP '04), pp. 1-10.

S. Kent & K. Seo, "Security Architecture for the Internet Protocol", RFC 4301, Dec. 2005, pp. 1-95.

Briscoe, A. Jacquet, C. Di Cairano-Gilfedder, A. Salvatori, A. Soppera and M. Koyabe "Policing Congestion Response in an Internetwork using Re-feedback". In Proc ACM SIGCOMM'05, Computer Communications Review 35(4) (Sep. 2005).

K. Ramakrishnan, S. Floyd and D. Black, "The Addition of Explicit Congestion Notification (ECN) to IP", RFC 3168, Sep. 2001, pp. 1-63.

S. Floyd and V. Jacobson, "Random Early Detection gateways for Congestion Avoidance", IEEE/ACM Transactions on Networking, vol. 1-4 (397-413) Aug. 1993: Use PDF link from http://ieeexplore.ieee.org/xpls/abs_all.isp?arnumber=251892&tag=1.

P. Eardley (editor), "Pre-Congestion Notification Architecture". IETF internet draft draft-ietf-pcn-architecture—Nov. 2, 2007: http://tools.ietf.org/id/draft-ietf-pcn-architecture-02.txt, pp. 1-45.

C. Perkins, "IP Encapsulation within IP", RFC 2003, Oct. 1996, pp. 1-14.

Bob Briscoe (BT), "Layered Encapsulation of Congestion Notification", IETF I-D (Jun. 2007), <draft-briscoe-tsvwg-ecn-tunnel-00.txt>, pp. 1-21.

B. Davie, B. Briscoe and J. Tay, "Explicit Congestion Marking in MPLS", IETF I-D, Jun. 2007. <draft-ietf-tsvwg-ecn-mpls-00>, pp. 1-22.

F-C Kuo and X Fu, "Probe-Aided MulTCP: an aggregate congestion control mechanism", ACM SIGCOMM Computer Communication Review vol. 38, Issue 1, Jan. 2008: Use PDF link from http://portal.acm.org/citation.cfm?id=1341434.

H. Balakrishnan, H. Rahul and S. Seshan, "An Integrated Congestion Management Architecture for Internet Hosts", ACM SIGCOMM, Sep. 1999: Use PDF link from http://portal.acm.org/citation.cfm?id=316220.

D. Ott, T. Sparks and K. Mayer-Patel, "Aggregate congestion control for distributed multimedia applications", IEEE INFOCOM '04, Mar. 2004.

M. Singh, P. Pradhan and P. Francis, "MPAT: aggregate TCP congestion management as a building block for Internet QoS", IEEE International Conference on Network Protocols, pp. 129-138, Oct. 2004: Use PDF link from http://ieeexplore.ieee.org/xpls/abs_all.jsp?arnumber=1348102.

\* cited by examiner

MEASURING NETWORK METRICS

This application is the U.S. national phase of International Application No. PCT/GB2009/000828 filed 27 Mar. 2009, which designated the U.S. and claims priority to European Application No. 08251138.7, filed 28 Mar. 2008, the entire contents of each of which are hereby incorporated by reference.

TECHNICAL FIELD

The present invention relates to measuring network metrics. More specifically, some aspects of the present invention relate to methods and apparatus for determining origin-specific network metrics related to one or more characteristics such as network congestion, delay, wireless loss, wireless battery life or others, in respect of a data network having at least one ingress node, where the or each ingress node may be receiving and forwarding data from one or more sources outside the data network in question. Other aspects of the present invention relate to methods and apparatus for determining target-specific network metrics in respect of a data network having at least one egress node via which data may be forwarded towards one or more destinations outside the data network in question.

BACKGROUND TO THE INVENTION AND PRIOR ART

Network owners and operators would like to be able to make customers accountable for any problems they cause to their network. One of the biggest problems for most networks is path congestion. When a network is congested then it is not able to provide good service to any of the customers of that network and thus its reputation may suffer. Accountability is generally done on the basis of the volume of traffic passed into the network by a given customer. Mechanisms allowing for collection of network path characteristics such as level of congestion are useful as such information may be used for more accurate accountability purposes. Such characteristics may also give advance notice of potential problems in the network and may enable the network to react to problems before they become too severe.

We start by presenting some basic concepts to facilitate the understanding of the mechanisms that are presented further on.

Packets

Data networks usually split the data they carry into small units known as packets. The actual communication between endpoints is controlled by various communication protocols. Each communication protocol required to carry the data across the Internet adds a header that contains the required information to enable the data exchange between the end hosts (usually a source host and a destination host). In the Internet, one of the most common types of packet consists of a payload that contains the data generated by an application running at the source, encapsulated by a Transmission Control Protocol (TCP) header which ensures the reliable delivery of the data, encapsulated again by an Internet Protocol (IP) header, which ensures that the data reaches the destination host for which it is aimed. The TCP header includes a unique sequence number (to allow the data to be reconstructed at the destination) and the IP header includes the IP addresses of the source and destination host.

Distributed Bandwidth Sharing and Congestion

Data traversing the Internet will follow a path between a series of routers, controlled by various routing protocols. If many paths need to use the same router in the network, this router can get congested (packets experience delays whilst using that network path). If sources persisted sending traffic through that router it may become overloaded or even fail. If sources still persist in sending traffic around this bottleneck it could force more routers to fail, and if the phenomenon keeps spreading, that can lead to a congestion collapse for the whole Internet—which occurred regularly in the mid-eighties.

The solution to that problem has been to ensure that sources take responsibility for the data-rate they send over the Internet by implementing congestion control mechanisms. Sources monitor path characterisation metrics to detect when the path their data is following is getting congested, in which case they react by reducing their throughput—while they usually slowly increase it when there is no sign of the path getting congested.

The typical path characterisation metrics sources monitor are the average roundtrip time (RTT) for the data path, the variance of the roundtrip time (referred to as jitter), and the level of congestion on the path, which is the primary parameter influencing the data-rate adaptation of a source sending data over a congested path.

The congestion level can be signalled either implicitly (through congested routers dropping packets) or explicitly (through mechanisms such as explicit congestion notification—see next subsection). Recently the most common option has been implicit signalling. Historically, routers would drop packets when they got completely saturated (which happens when a traffic burst cannot be accommodated in the buffer of the router). This policy is called "Droptail". The problem with this is that it can lead to a phenomenon known as global synchronisation which reduces the overall efficiency of the network. An improvement has been proposed whereby routers monitor the average queue length in their buffer. When this is higher than a given threshold, the router starts to drop packets with a probability which increases with the excess length of the queue over the threshold. This policy is called Random Early Detection (RED). It is widely used in today's internet because it allows sources to react more promptly to incipient congestion. Sources using TCP are able to detect losses because a packet loss causes a gap in the sequence; whenever a source detects a loss, it halves its data-rate, which alleviates the congestion on the router at the bottleneck.

Explicit Congestion Notification

Explicit Congestion Notification (ECN) [ECN] further improves on RED by using a two-bit ECN field in the IP header to signal congestion. It runs the same algorithm as RED, but instead of dropping a packet, it sets its ECN field to the Congestion Experienced (CE) codepoint. The ECN standard requires the sender to echo any congestion mark signalled in the data; for instance, a TCP receiver sets the Echo Congestion Experienced (ECE) flag in the TCP header, which the TCP source interprets as if the packet has been dropped for the purpose of its rate control. In turn the source will reduce its data-rate and will set Congestion Window Reduced (CWR) in the TCP header of the next packet.

The four values of the two-bit ECN field are:
Not-ECT (Not ECN Capable Transport), which signifies that the packet belongs to a flow that doesn't support ECN
ECT(0) and ECT(1), which signify that the packet belongs to a flow that supports ECN but and that upstream routers haven't had to mark the packet.
(CE) Congestion Experienced which signals to the receiver that a packet has experienced congestion along its path.

IP Tunnels

In the context of a data network, tunnelling consists of encapsulating one protocol header inside another protocol header. The aim is to improve the network service, for instance in terms of connectivity (it may allow data to get across a network it couldn't get across otherwise) or of security (the data may be encrypted so it cannot be used if it is intercepted).

A special case of tunnels are IP-in-IP tunnels where the original header is retained intact, and simply encapsulated in another standard IP header, at the entrance of the tunnel. The outer IP header source and destination addresses identify the "endpoints" of the tunnel while the inner header preserves the original source and destination addresses for the packet. As the packet traverses the tunnel, the outer header may be modified as the header of any other packet on the same path. When the packet reaches the other end of the tunnel, decapsulation occurs: the outer header is stripped off, the original header fields are updated if necessary and the packet is forwarded to its originally-intended destination.

Re-Feedback

The re-Feedback proposal [Briscoe05c] provides a mechanism whereby the congestion information that a receiver sends back to a source can be re-inserted into the forward data path, thus allowing nodes along the path to see downstream congestion information as well as upstream information. This allows network providers to trace the source of any congestion and hold appropriate customers to account for this congestion. The proposal also outlines how a similar mechanism could work for other characterisation metrics such as RTT.

Pre-Congestion Notification

Pre-Congestion Notification (PCN) [PCN] is a mechanism for protecting the quality of service of certain flows within a given region of the network. Flows are only admitted to the network if they won't cause too much congestion. In order to work out if a flow can be admitted, the incipient congestion inside the network is monitored. This allows the ingress node to predict what the edge-to-edge congestion will be for any given flow asking for admission.

PRIOR ART

Congestion signalling has been well documented in many forms: whether it is by using an implicit signal (such as RED) or an explicit binary signal (such as ECN). The generic aspects of traffic tunnelling have also been documented in standard documents, for instance "IP Encapsulation within IP" [RFC 2003] for IP-in-IP tunnels. [Briscoe07] reviews best practice for handling binary congestion marking in tunnels, by building on the recommendations available in the ECN and IPsec RFC documents [ECN, IPsec] and in the IETF Internet Draft on "Explicit Congestion Marking in MPLS" [DBT07]. PCN introduces the idea of recording the congestion (or incipient congestion) across a section of a network in order to decide whether to admit a flow. Re-feedback introduces the idea of using downstream congestion information to trace which flows are causing problems within a network.

REFERENCES

[IPsec] S. Kent & K. Seo, "Security Architecture for the Internet Protocol", RFC 4301, December 2005
[Briscoe05c] B. Briscoe, A. Jacquet, C. Di Cairano-Gilfedder, A. Salvatori, A. Soppera and M. Koyabe "Policing Congestion Response in an Internetwork using Re-feedback". In Proc ACM SIGCOMM'05, Computer Communications Review 35(4) (September 2005).
[ECN] K. Ramakrishnan, S. Floyd and D. Black, "The Addition of Explicit Congestion Notification (ECN) to IP", RFC 3168, September 2001.
[RED] S. Floyd and V. Jacobson, "Random Early Detection gateways for Congestion Avoidance", IEEE/ACM Transactions on Networking, Vol 1-4 (397-413) August 1993
[PCN] P. Eardley (editor), "Pre-Congestion Notification Architecture". IETF internet draft draft-ietf-pcn-architecture-02 November 2007
[RFC 2003] C. Perkins, "IP Encapsulation within IP", RFC 2003, October 1996.
[Briscoe07] Bob Briscoe (BT), "Layered Encapsulation of Congestion Notification", IETF I-D (June 2007). <draft-briscoe-tsvwg-ecn-tunnel-00.txt>
[DBT07] B. Davie, B. Briscoe and J. Tay, "Explicit Congestion Marking in MPLS", IETF I-D, June 2007. <draft-ietf-tsvwg-ecn-mpls-00>

None of the techniques outlined above provide a mechanism that allows one to monitor congestion and other metrics over any section (path) of a network without the need for protocol changes or significant equipment changes. The present inventors have realised that such a technique would potentially allow the information to be used for network monitoring, accountability and control purposes.

Separately from the above prior art, there have been several proposals for end-to-end congestion information to be aggregated across different flows, of which the following further references are considered to be good examples.

FURTHER REFERENCES

[Kuo08] F-C Kuo and X Fu, "Probe-Aided MulTCP: an aggregate congestion control mechanism", ACM SIGCOMM Computer Communication Review Vol 38, Issue 1, January 2008
[Balakrishnan99] H. Balakrishnan, H. Rahul and S. Seshan, "An Integrated Congestion Management Architecture for Internet Hosts", ACM SIGCOMM, September 1999.
[Ott04] D. Ott, T. Sparks and K. Mayer-Patel, "Aggregate congestion control for distributed multimedia applications", IEEE INFOCOM '04, March 2004.
[Singh04] M. Singh, P. Pradhan and P. Francis, "MPAT: aggregate TCP congestion management as a building block for Internet QoS", IEEE International Conference on Network Protocols, pages 129-138, October 2004.

While these proposals may attempt to deal with the congestion control of the aggregate traffic across a network or across the Internet, they only enable determination of path metrics between a single ingress point and a single egress point.

PRIOR PATENT DOCUMENTS

International patent application WO 2005/096566 relates to the technology referred to above as the "re-Feedback proposal". It relates to data networks, and to nodes making up parts of data networks, arranged to derive information relating to the characterisation of paths taken by data travelling between nodes in the networks. Path characterisation information fed back from a receiver to a provider allows nodes subsequently forwarding data along the same path to be informed of characteristics of the downstream path. It will be understood that the path characterisation information is derived from data units all of which are travelling along the same end-to-end path from the same provider node to the same receiver node.

International patent application WO 2006/052174 relates to congestion handling in a packet switched network domain, and proposes methods and systems that can be compared with the PCN mechanism discussed above.

SUMMARY OF THE INVENTION

According to a first aspect of the present invention, there is provided a method of determining an origin-specific network metric in respect of a data network having at least one ingress node, said method comprising:

receiving data items from one or more sources outside said data network via one or more ingress nodes of said data network;

forwarding each of a plurality of said data items from said one or more ingress nodes with one or more headers comprising fields for carrying the following information:

origin information indicative of either or both of the source from which the data item has been received and the ingress node via which the data item has been received; and path metric information indicative of a characteristic required to be monitored as the data item traverses a portion of a path across the data network;

causing each of said data items to traverse a portion of a path across the data network;

updating the fields carrying path metric information in respect of said data items in dependence on said characteristic as the data items traverse the network;

determining in respect of each of a plurality of data items the origin information and the path metric information after the data item has traversed a portion of a path across the data network, and deriving in dependence on said determined path metric information and on said origin information an origin-specific path metric relating to the characteristic in respect of the portion of the path across the data network from the ingress node via which the data item has been received; and in respect of a plurality of data items at least some of which are traversing different end-to-end paths, combining origin-specific path metrics derived in respect of said data items in the event that said origin-specific path metrics relate to characteristics in respect of data items having origin information indicative of a common origin, whereby to determine an origin-specific network metric.

The step of forwarding data items with one or more headers may comprise encapsulating the data items with one or more additional headers. This may be done in order to enable the use of tunnelling to enable the data items to traverse the data network, after which the data items may be decapsulated. The one or more additional headers may include a header comprising a field for carrying path congestion information. According to preferred embodiments, this may be a header comprising an Explicit Congestion Notification (ECN) field, for example, but other fields capable of carrying path congestion information may be used. Encapsulation may not be necessary, however, if the data items already have fields capable of carrying the appropriate information, for example.

The origin information in respect of a particular data item may be indicative of the source from which the data item has been received. Alternatively or additionally, the origin information may be indicative of the ingress node via which the data item has been received.

According to preferred embodiments, the path metric information in respect of a particular data item may be indicative of a characteristic such as network congestion on the path traversed by the data item. Alternatively or additionally, the path metric information may be indicative of one or more other characteristics related to the path traversed by the data item such as delay, wireless loss, wireless battery life, etc.

According to preferred embodiments, the data network may have a plurality of egress nodes. In such embodiments, respective egress nodes may perform the determination of origin information and path metric information in respect of data items that have traversed a portion of a path across the data network to said egress nodes. The respective egress nodes may then also perform the derivation of origin-specific path metrics relating to the characteristic in respect of portions of paths across the data network thereto.

The method may further comprise providing the origin-specific path metrics to a network control means, which may then perform the step of combining the origin-specific path metrics. This may be performed in respect of origin-specific path metrics derived by a plurality of different egress nodes, for example. Such a network control means may then provide origin-specific network metrics to the one or more ingress nodes via which the data items to which they relate have been received.

Alternatively or additionally, the method may further comprise providing the origin-specific path metrics to one or more ingress nodes via which the data items to which they relate have been received. The ingress nodes may then perform the step of combining the origin-specific path metrics.

The method may further comprise forwarding the data items on to one or more destinations outside the network, or to one or more destination networks.

The step of combining origin-specific path metrics may comprise combining origin-specific path metrics in respect of data items at least some of which are traversing paths towards different destinations. Alternatively or additionally, the step of combining origin-specific path metrics may comprise combining origin-specific path metrics in respect of data items at least some of which are traversing paths towards one or more destinations outside the network via different egress nodes of the network.

According to a second aspect of the present invention, corresponding to the first aspect, there is provided an apparatus for determining an origin-specific network metric in respect of a data network, said apparatus comprising:

one or more ingress nodes for receiving data items from one or more sources outside said data network into said data network, said one or more ingress nodes comprising forwarding means operable to forward each of a plurality of said data items from said one or more ingress nodes with one or more headers comprising fields for carrying the following information:

origin information indicative of either or both of the source from which the data item has been received and the ingress node via which the data item has been received; and path metric information indicative of a characteristic required to be monitored as the data item traverses a portion of a path across the data network;

routing means operable to cause each of said data items to traverse a portion of a path across the data network;

updating means operable to update the fields carrying path metric information in respect of said data items in dependence on said characteristic as the data items traverse the network;

origin-specific path metric deriving means operable to determine in respect of each of a plurality of data items the origin information and the path metric information after the data item has traversed a portion of a path across the data network, and to derive in dependence on said determined path metric information and on said origin information an origin-specific path metric relating to the characteristic in respect of the portion of the path across the data network from the ingress node via which the data item has been received; and origin-specific network metric determining means operable to combine origin-specific path metrics derived in respect of a plurality of different data items at least some of which are traversing different end-to-end paths in the event that said origin-specific path metrics relate to characteristics in respect of data items having origin information indicative of a common origin, whereby to determine an origin-specific network metric.

It will be understood that options and variations listed above in relation to the first aspect are equally applicable in relation to the second aspect.

According to a third aspect of the present invention, there is provided a method of determining a target-specific network metric in respect of a data network having at least one egress node, said method comprising:

receiving a plurality of data items each having an intended destination outside said data network;

causing each of said data items to traverse a portion of a path across the data network to said one or more egress nodes, each of said data items having one or more headers comprising fields for carrying the following information:

target information indicative of either or both of a destination outside the network to which the data item is intended to be forwarded and the egress node via which the data item is intended to be forwarded; and path metric information indicative of a characteristic required to be monitored as the data item traverses a portion of a path across the data network;

updating the fields carrying path metric information in respect of said data items in dependence on said characteristic as the data items traverse the network;

forwarding said data items to one or more destinations outside said data network via one or more egress nodes of said data network;

determining in respect of each of a plurality of data items the target information and the path metric information after the data item has traversed a portion of a path across the data network, and deriving in dependence on said determined path metric information and on said target information a target-specific path metric relating to the characteristic in respect of the portion of the path across the data network to the egress node via which the data item has been forwarded; and in respect of a plurality of data items at least some of which are traversing different end-to-end paths, combining target-specific path metrics derived in respect of said data items in the event that said target-specific path metrics relate to characteristics in respect of data items having target information indicative of a common target, whereby to determine a target-specific network metric.

According to a fourth aspect of the present invention, corresponding to the third, aspect, there is provided an apparatus for determining a target-specific network metric in respect of a data network having at least one egress node, said apparatus comprising:

at least one receiver node operable to receive a plurality of data items each having an intended destination outside said data network;

routing means operable to cause each of said data items to traverse a portion of a path across the data network to said one or more egress nodes, each of said data items having one or more headers comprising fields for carrying the following information:

target information indicative of either or both of a destination outside the network to which the data item is intended to be forwarded and the egress node via which the data item is intended to be forwarded; and path metric information indicative of a characteristic required to be monitored as the data item traverses a portion of a path across the data network;

updating means operable to update the fields carrying path metric information in respect of said data items in dependence on said characteristic as the data items traverse the network;

forwarding means operable to forward said data items to one or more destinations outside said data network via said one or more egress nodes of said data network;

target-specific path metric determining means operable to determine in respect of each of a plurality of data items the target information and the path metric information after the data item has traversed a portion of a path across the data network, and to derive in dependence on said determined path metric information and on said target information a target-specific path metric relating to the characteristic in respect of the portion of the path across the data network to the egress node via which the data item has been forwarded; and target-specific network metric determining means operable to combine target-specific path metrics derived in respect of a plurality of data items at least some of which are traversing different end-to-end paths in the event that said target-specific path metrics relate to characteristics in respect of data items having target information indicative of a common target, whereby to determine a target-specific network metric.

It will be understood that options and variations corresponding to those listed above in relation to the first aspect are equally applicable in relation to the third and fourth aspects.

Preferred embodiments of the present invention enable determination of a metric for an aggregate of traffic either with a common origin, irrespective of the intended destinations of individual flows (i.e. an origin-specific network metric), or with a common target, irrespective of the initial sources of individual flows (i.e. a target-specific network metric). It wouldn't be possible to use the mechanisms proposed in the references listed in the previous section relating to aggregation of end-to-end congestion information in this way because the information they provide is only partial, and is simply applicable for (and generally used for) improving the rate control in respect of the aggregate.

Superficially, preferred embodiments may appear to be related to PCN, however there are a number of clear differences. PCN is designed to admit traffic to a controlled region of a network. As such it measures edge-to-edge metrics such as incipient congestion between ingress and egress pairs. This information is used to decide whether there is sufficient remaining capacity to admit a given new flow. By contrast preferred embodiments may measure a path metric such as the actual congestion level (as given by ECN, for example) across a given section of the network. This information can then be used by the network owner for accounting and planning purposes.

In contrast with preferred embodiments, the PCN framework doesn't allow monitoring of a network metric for an aggregate defined by its origin: the congestion metrics it monitors also require the definition of an egress point.

Preferred embodiments may also appear to have similarities with re-feedback. However re-feedback requires both upstream and downstream congestion information to be carried on each packet whereas preferred embodiments require only the upstream information.

Preferred embodiments may utilise a technique corresponding to IP tunnelling but an adaptation of this is used in order to allow the measurement of path metrics that couldn't have been measured otherwise.

BRIEF DESCRIPTION OF THE DRAWINGS

A preferred embodiment of the present invention will now be described with reference to the appended drawings, in which.

DESCRIPTION OF PREFERRED
EMBODIMENTS OF THE INVENTION

Preferred embodiments of the present invention provide methods for determining a metric for an aggregate of traffic defined by its common origin or by its common target.

With reference to FIGS. 1 to 4, a method of determining an "origin-specific" network metric according to a preferred embodiment will be described in detail. It will be understood that by using a "mirror-image" of such a method, determination of a "target-specific" network metric could equally well be performed. It will be understood that in relation to "origin-specific" embodiments, "origin" may refer either to a source (in particular, a source outside the network) from which data items have been received, or may refer to the ingress node via which data items have been received from a source outside the network. Corresponding to this, in relation to "target-specific" embodiments, "target" may refer either to an eventual destination (in particular, a destination outside the network) which data items are eventually intended to reach, or to the egress node via which data items are forwarded on leaving the network on the way to an eventual destination.

The description of this embodiment focuses in particular on one type of metric: the contribution to local congestion, referred to as "k", of a specific aggregate of traffic, defined by its origin. The value of the metric at a node is obtained in the same way as standard congestion: the level of congestion an aggregate of traffic experiences while transiting across a network is the same as its contribution to congestion in that network.

Other metrics could be monitored in the same or similar ways, such as interference levels in the case of ad hoc wireless networks, or power consumption to apportion the environmental impact of the traffic generated. Embodiments of the invention will be described in the context of contribution to congestion, but it will be understood that the invention is not intended to be limited to congestion metrics; other embodiments may relate to the determination of metrics relation to other types of metric including, but not limited to, those referred to above.

Figure 1:
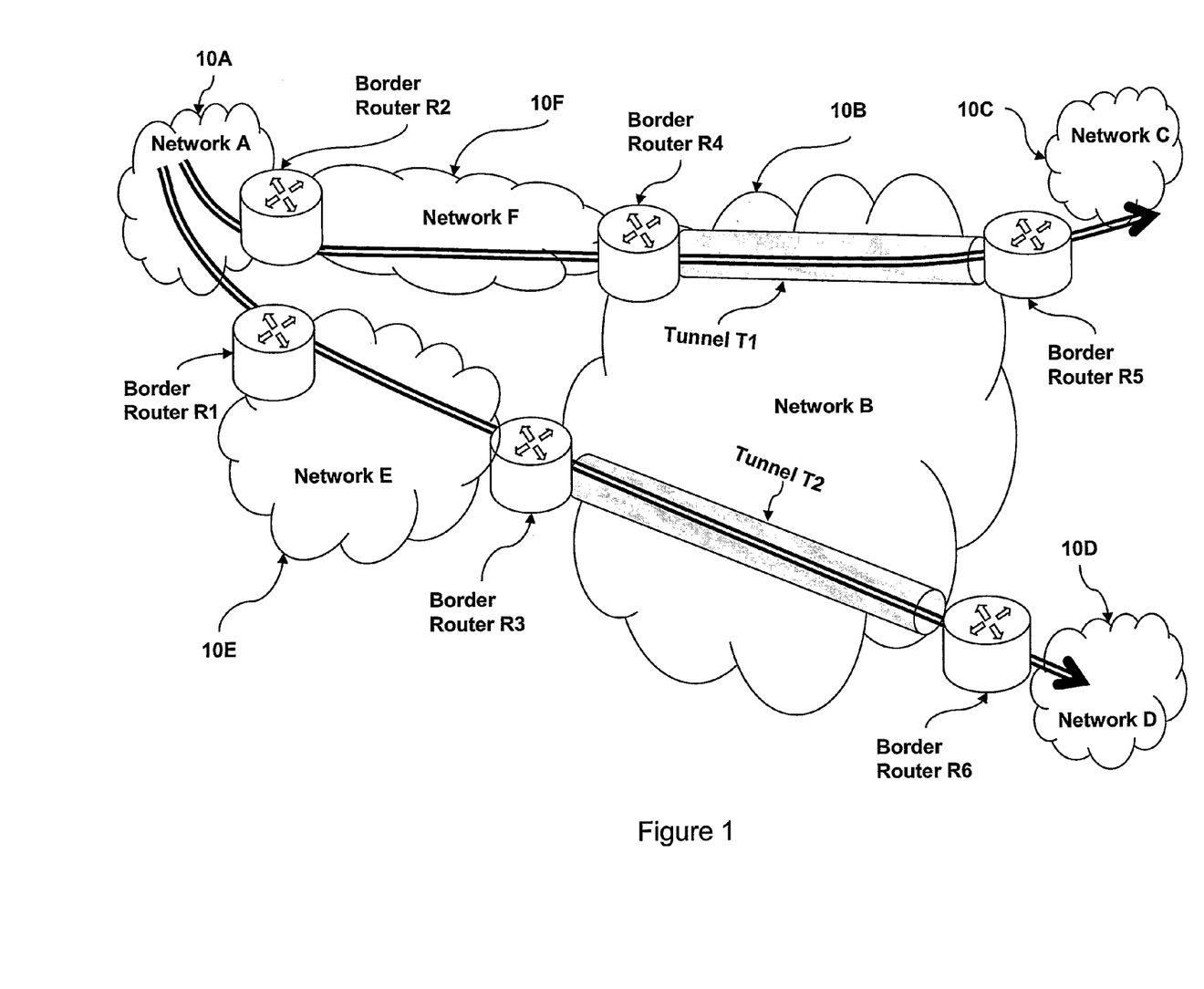
FIG. 1 shows a schematic diagram of an example network and illustrates how the origin of data items may be defined with respect to their source address in a given address space.
Figure 2:
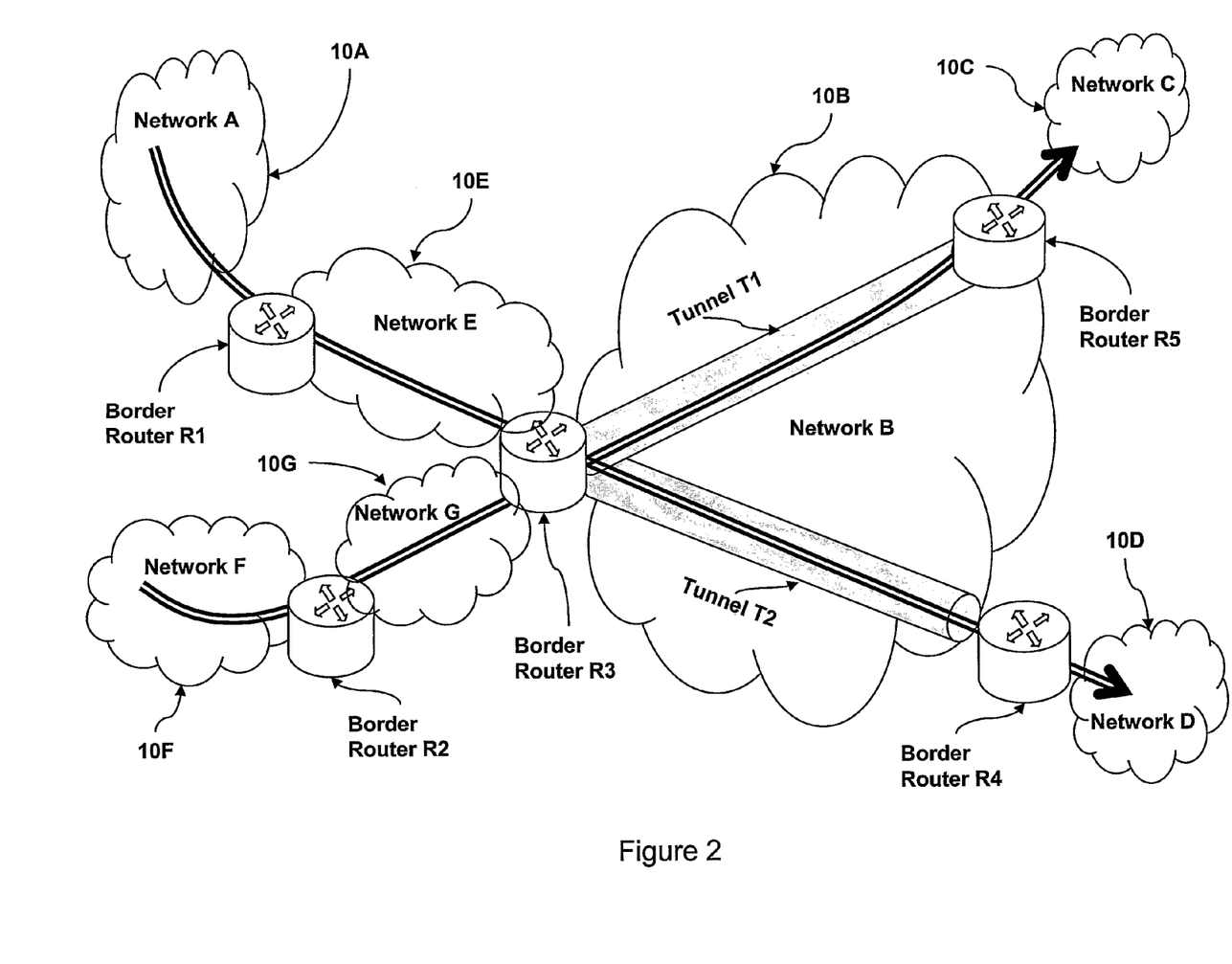
FIG. 2 shows a schematic diagram of an example network and illustrates how the origin of data items may be defined with respect to the border router via which they enter a network.

With reference to FIGS. 1 and 2, the defining "origin" of data items can be characterised in different ways. Two possible definitions of the origin are of particular interest:
(i) Traffic coming from a source address belonging to a given address space, for instance a set of IP prefixes; and
(ii) Traffic entering a network through a given border gateway.

In the first case, the information may be useful for monitoring potential Denial of Service activity. In the second case, the information may be useful for network operators: the theory of networks economics presents congestion signals as a means to detect network links whose capacity may be worth upgrading. These two definitions of the "origin" for the aggregate lead to two different types of network context, in respect of which methods according to different embodiments may be performed. The network contexts for each of these definitions are illustrated in FIGS. 1 and 2, as described below. In each of these, the network in respect of which the metric-determining method is to be performed is Network B (indicated by reference numeral 10B).

FIG. 1 illustrates a possible network configuration in relation to which the "origin" of traffic is most usefully defined based on the source address, which is generally outside the network 10B in respect of which the metric-determining method is to be performed. Data items having source addresses belonging to the same address space may be treated as having a "common origin". In that case, Network A (indicated by reference numeral 10A) is referred to as being "multi-homed". Not all traffic originating from Network A and transiting through Network B has to follow the same path between the two: traffic intended to reach a destination in Network D (10D) may transit through Network E (10E), while traffic intended to reach a destination in Network C (10C) may transit through Network F (10F). This may be achieved based on routing tables of Network A.

FIG. 2 illustrates a possible network configuration in relation to which the "origin" of traffic is most usefully defined based on the ingress point through which the traffic enters the network 10B in respect of which the metric-determining method is to be performed. In that case flows may be said to belong to the same aggregate if they enter Network B through the same Border Router R3, even though the respective sources and destinations of the traffic may be completely different.

It will be noted that in both FIGS. 1 and 2, traffic is shown crossing Network B (10B) by means of tunnels T1 and T2. These tunnels have been shown for the purposes of facilitating an understanding of certain preferred embodiments of the invention, in which tunnels are used in order to allow the measurement of path metrics that couldn't have been measured otherwise, for example, but it should be noted that the invention is not intended to be limited to embodiments which make use of tunnelling—other preferred embodiments will be described in which data items traverse the network in question without the use of tunnelling.

An embodiment will principally be described in relation to a case where the origin of the aggregate is defined as a common ingress point to the local network 10B. Adjustments which may be required for embodiments when the origin is defined as the source address space will be outlined briefly later.

Incoming traffic onto the local network 10B is processed by the ingress gateway (Border Router R3), which ensures that certain required information fields are available in packet headers, namely:

a field for capturing local congestion
a field for capturing the origin of the traffic: in this case, the identity of the ingress If Internet Protocol version 6 (IPv6) options can be used efficiently (we are not considering the use of IPv4 options as they are not used commonly), a hop-by-hop extension header may be used that includes a congestion level field, and a field for the identity of the ingress point of the traffic. The congestion level in the extension header may then be updated by every node a packet traverses, so that it reflects the contribution to congestion of that packet along the path it has followed across the network. The egress gateway can then retrieve the identity of the ingress point from the extension header. This technique is described below with reference to FIG. 3.

Figure 3:
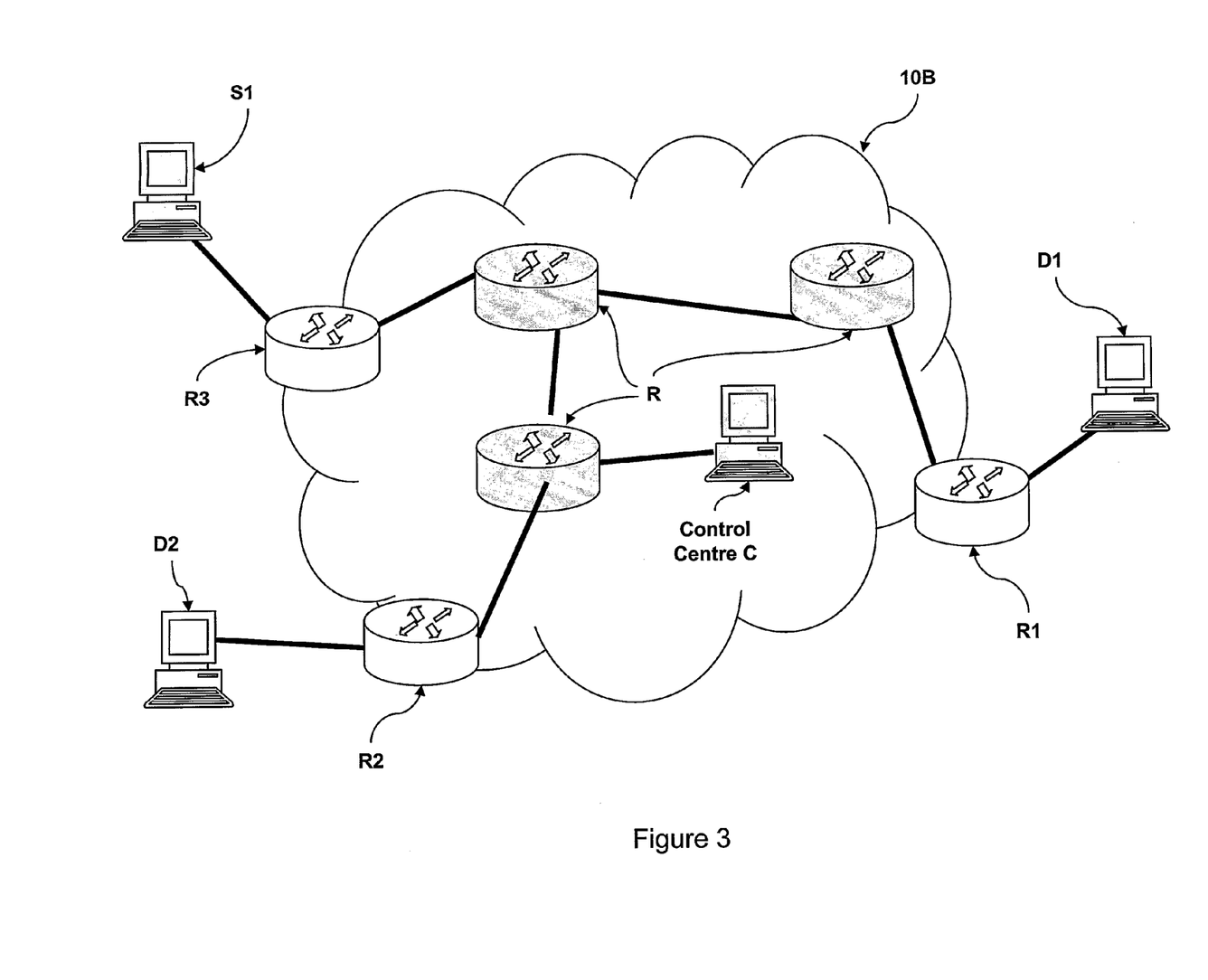
FIG. 3 shows an end-to-end path which passes through a network in relation to which a method according to a preferred embodiment of the invention is performed.

FIG. 3 again illustrates the situation where common origin is defined as common ingress point, in the more specific situation where an extension header is used. When packets from a source S1 arrive at an ingress router R3 of the network 10B (which, as before, is the network in respect of which the metric-determining method according to a preferred embodiment is to be performed), a hop-by-hop extension header is added to the packet. The extension header includes a field indicating the origin of the traffic, which remains unchanged, and a field indicating the value of the contribution to congestion within the network 10B. This congestion field may be updated by every node or router R in the local network. Packets may then be forwarded towards the appropriate destination (D1, D2, etc.) via an appropriate egress point (two possible egress points, R1 and R2, are shown in FIG. 3).

Each egress point (R1, R2) keeps a table with an entry for each of the aggregates that are monitored. Each entry consists of:
  a description of the origin of the aggregate: either the identity of the ingress point, or the source address space;
  a timestamp indicating the time of start of the validity period;
  a value for the metrics being monitored; and
  a value for the volume of traffic for that aggregate.

When the packet arrives at the relevant egress point, the origin field is read to identify which entry or entries need updating. For each of those the relevant metrics are updated and the volume of traffic is also updated. The packet is then forwarded to its destination.

The combination of the partial metrics held by the egress nodes can happen either in "push" mode or in "pull" mode. In push mode, the egresses report periodically to the entities (for instant a network Control Centre C of the network 10B in question) that require the monitored metrics. In pull mode, these entities prompt the egress routers for that information.

Figure 4A:
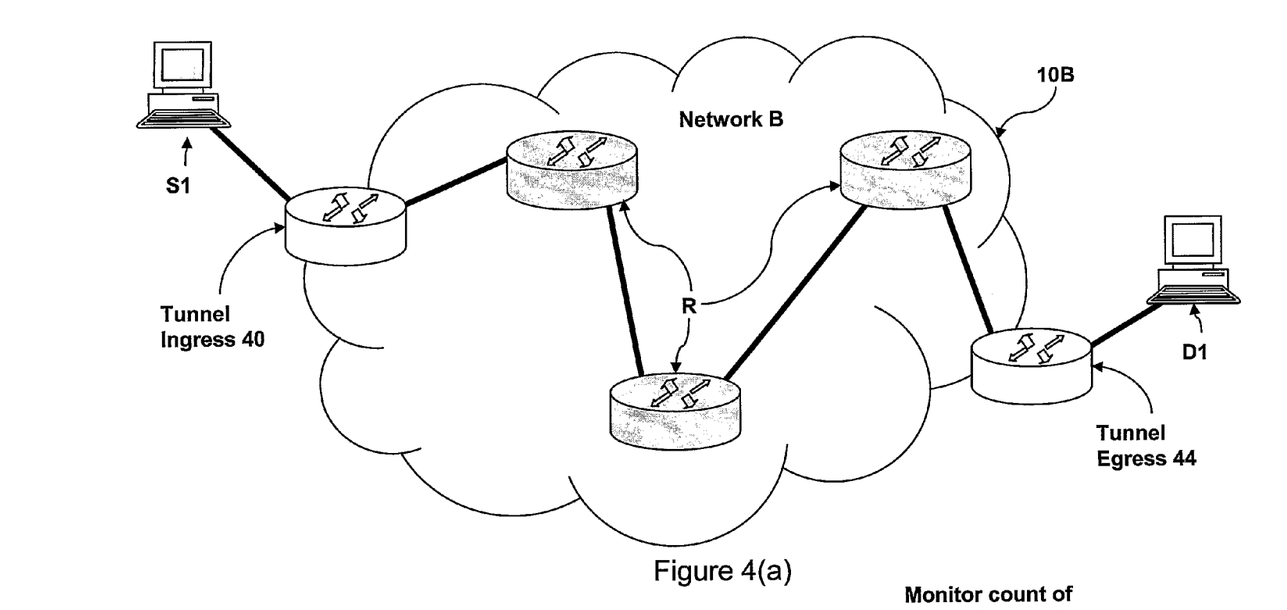
FIGS. 4(a) and 4(b) illustrate the tunnelling mechanism.
Figure 4B:
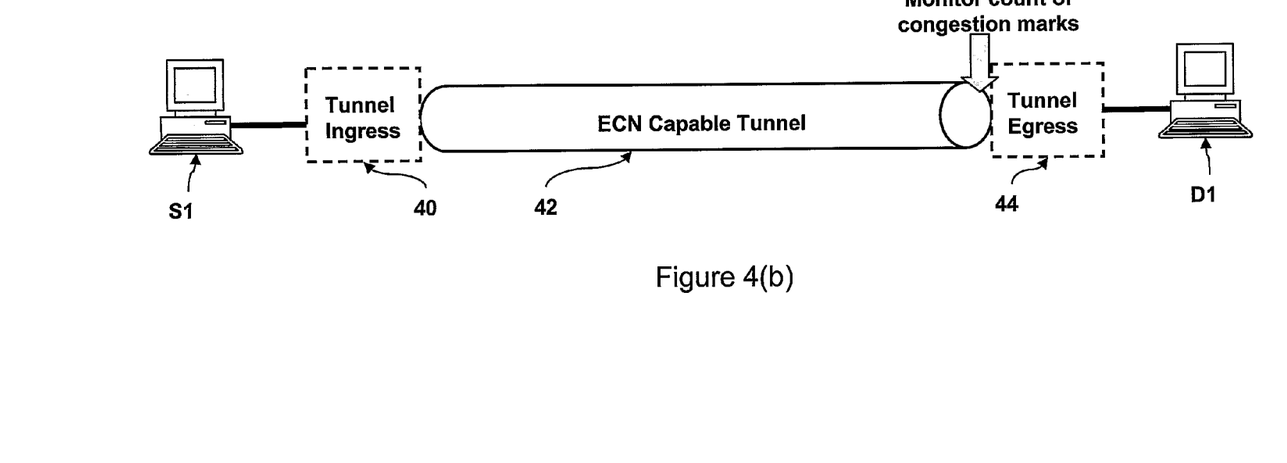

An alternative to the technique described above will now be described with reference to FIGS. 4(a) and 4(b), which illustrate together the tunnelling mechanism referred to earlier. By virtue of this, a tunnel 42 can be set up from a router or node via which packets from source S1 enter the network 10B in question. This then serves as the tunnel ingress gateway 40 for packets being forwarded towards a tunnel egress gateway 44 on the path to the destination D1 of the traffic. Incoming packets are encapsulated at tunnel ingress gateway 40. With reference to FIG. 4(b), the encapsulation may be used to ensure that the packets carry an ECN field in their outer header for example, in which case tunnel 42 may be regarded as an ECN capable tunnel. The congestion field (ECN or otherwise) of the outer header of these packets may be updated along the path by other routers R in network 10B, such that the value of its signal at the end of the path through tunnel 42 represents the contribution to congestion of that packet along the path it has followed across network 10B.

The IP address of ingress gateway 40 is used as the source IP address in the outer header, which allows egress gateway 44 to identify to which aggregate each packet belongs.

In both cases (the IP option outlined with reference to FIG. 3, and the tunnelling option outlined with reference to FIGS. 4(a) and 4(b)), the egress gateway (R1 or 44) may follow the same steps when packets reach it, as set out below:
  1. It identifies to which aggregate the packet belongs
  2. It retrieves the congestion information
  3. It updates the congestion information for that aggregate
  4. It strips off the outer header or the extension header
  5. It updates the congestion field of the packet to reflect the congestion experienced across the local network
  6. It forwards the packet as required to reach its destination.

These steps are carried out for each arriving packet.

As an example, the egress point may keep the following information for each aggregate:
  the identity of the aggregate (as defined by the ingress point, in that case)
  the volume of traffic to date $V_{egress}$
  the contribution to congestion to date $k_{egress}$
  the time of the last packet forwarded
  the time of the first packet forwarded.

Egress points may keep records for smaller aggregates, for instance the aggregate transiting from a given ingress point, in which case they may also update the congestion estimate for that section of the path.

Computing the metric for the aggregate may involve a Control Centre (C in FIG. 3) to retrieve the information from all the egress gateways. As before, this can be done in "push" mode where egresses report to the control centre on a periodic basis, or in "pull" mode, where the control centre prompts the egress nodes for updates, which can be done over a multicast channel for instance.

Different aggregates may be monitored by different control centres. It is possible for instance for the control centre for the aggregate of traffic incoming through a given ingress point to be located on that ingress point.

On receiving records from the egress points, the control centre will update its own record for the aggregate, which may contain the following information
  the identity of the aggregate (as defined by the ingress point, in that case)
  the volume of traffic to date $V_{aggr}$
  the contribution to congestion to date $k_{aggr}$
  the time of the last packet forwarded
  the time of the first packet forwarded.

For contribution to congestion, the update is generally additive:

$$V_{aggr} \mathrel{+}= V_{egress}$$

$$k_{aggr} \mathrel{+}= k_{egress}$$

The control centre may keep individual records from egresses to monitor the evolution of the contribution to congestion.

When the definition of an aggregate is given with respect to the address space of the source IP address, the aggregate to which the packet belongs may be determined from the packet header in all cases. This may simplify the embodiment in the case when IPv6 options are used—in that case, the extension header may still be needed to ensure the contribution to congestion in the local network only is duly captured.

Finally, it should be noted that a packet may be part of several aggregates.

The invention claimed is:

1. A method of determining an origin-specific network metric in respect of a data network having at least one ingress node, said method comprising:
receiving data items from one or more sources outside said data network via one or more ingress nodes of said data network;
forwarding each of a plurality of said data items from said one or more ingress nodes with one or more headers comprising fields for carrying the following information:
origin information indicative of either or both of the source from which the data item has been received and the ingress node via which the data item has been received; and
path metric information indicative of a characteristic required to be monitored as the data item traverses a portion of a path across the data network;
causing each of said data items to traverse a portion of a path across the data network;
updating the fields carrying path metric information in respect of said data items in dependence on said characteristic as the data items traverse the network;
determining in respect of each of a plurality of data items the origin information and the path metric information after the data item has traversed a portion of a path across the data network, and deriving in dependence on said determined path metric information and on said origin information an origin-specific path metric relating to the characteristic in respect of the portion of the path across the data network from the ingress node via which the data item has been received; and
in respect of a plurality of data items at least some of which are traversing different end-to-end paths, combining origin-specific path metrics derived in respect of said data items in the event that said origin-specific path metrics relate to characteristics in respect of data items having origin information indicative of a common origin, whereby to determine an origin-specific network metric.

2. A method according to claim 1 wherein the step of forwarding data items with one or more headers comprises encapsulating data items with one or more additional headers.

3. A method according to claim 2 wherein said one or more additional headers include a header comprising a field for carrying path congestion information.

4. A method according to claim 2 wherein said one or more additional headers include a header comprising an Explicit Congestion Notification field.

5. A method according to claim 2 wherein said method further comprises decapsulating the data items.

6. A method according to claim 2 wherein said origin information is indicative of the source from which the data item has been received.

7. A method according to claim 1 wherein said origin information is indicative of the ingress node via which the data item has been received.

8. A method according to claim 1 wherein said path metric information is indicative of network congestion on the path.

9. A method according to claim 1 wherein said path metric information is indicative of one or more of delay, wireless loss, wireless battery life.

10. A method according to claim 1 wherein said data network has a plurality of egress nodes, and wherein respective egress nodes perform either or both of:
the determination of origin information and path metric information in respect of data items that have traversed a portion of a path across the data network to said egress nodes; and
the derivation of origin-specific path metrics relating to the characteristic in respect of portions of paths across the data network thereto.

11. A method according to claim 1 wherein said method further comprises providing the origin-specific path metrics to a network control means, said network control means performing the step of combining the origin-specific path metrics.

12. A method according to claim 11 wherein said network control means provides origin-specific network metrics to one or more ingress nodes via which the data items to which they relate have been received.

13. A method according to claim 1 wherein said method further comprises providing the origin-specific path metrics to one or more ingress nodes via which the data items to which they relate have been received, said one or more ingress nodes performing the step of combining the origin-specific path metrics.

14. A method according to claim 1 wherein said method further comprises forwarding the data items on to one or more destination networks.

15. A method according to claim 1 wherein the step of combining origin-specific path metrics comprises combining origin-specific path metrics in respect of a plurality of data items at least some of which are traversing paths towards different destinations, or are traversing paths towards one or more destinations outside said network via different egress nodes of said network.

16. Apparatus for determining an origin-specific network metric in respect of a data network, said apparatus comprising:
one or more ingress nodes for receiving data items from one or more sources outside said data network into said data network, said one or more ingress nodes comprising forwarding means operable to forward each of a plurality of said data items from said one or more ingress nodes with one or more headers comprising fields for carrying the following information:
origin information indicative of either or both of the source from which the data item has been received and the ingress node via which the data item has been received; and
path metric information indicative of a characteristic required to be monitored as the data item traverses a portion of a path across the data network;
routing means operable to cause each of said data items to traverse a portion of a path across the data network;
updating means operable to update the fields carrying path metric information in respect of said data items in dependence on said characteristic as the data items traverse the network;
origin-specific path metric deriving means operable to determine in respect of each of a plurality of data items the origin information and the path metric information after the data item has traversed a portion of a path across the data network, and to derive in dependence on said determined path metric information and on said origin information an origin-specific path metric relating to the characteristic in respect of the portion of the path across the data network from the ingress node via which the data item has been received; and
origin-specific network metric determining means operable to combine origin-specific path metrics derived in respect of a plurality of different data items at least some of which are traversing different end-to-end paths in the event that said origin-specific path metrics relate to characteristics in respect of data items having origin information indicative of a common origin, whereby to determine an origin-specific network metric.

17. A method of determining a target-specific network metric in respect of a data network having at least one egress node, said method comprising:
- receiving a plurality of data items each having an intended destination outside said data network;
- causing each of said data items to traverse a portion of a path across the data network to said one or more egress nodes, each of said data items having one or more headers comprising fields for carrying the following information:
  - target information indicative of either or both of a destination outside the network to which the data item is intended to be forwarded and the egress node via which the data item is intended to be forwarded; and
  - path metric information indicative of a characteristic required to be monitored as the data item traverses a portion of a path across the data network;
- updating the fields carrying path metric information in respect of said data items in dependence on said characteristic as the data items traverse the network;
- forwarding said data items to one or more destinations outside said data network via one or more egress nodes of said data network;
- determining in respect of each of a plurality of data items the target information and the path metric information after the data item has traversed a portion of a path across the data network, and deriving in dependence on said determined path metric information and on said target information a target-specific path metric relating to the characteristic in respect of the portion of the path across the data network to the egress node via which the data item has been forwarded; and
- in respect of a plurality of data items at least some of which are traversing different end-to-end paths, combining target-specific path metrics derived in respect of said data items in the event that said target-specific path metrics relate to characteristics in respect of data items having target information indicative of a common target, whereby to determine a target-specific network metric.

18. Apparatus for determining a target-specific network metric in respect of a data network having at least one egress node, said apparatus comprising:
- at least one receiver node operable to receive a plurality of data items each having an intended destination outside said data network;
- routing means operable to cause each of said data items to traverse a portion of a path across the data network to said one or more egress nodes, each of said data items having one or more headers comprising fields for carrying the following information:
  - target information indicative of either or both of a destination outside the network to which the data item is intended to be forwarded and the egress node via which the data item is intended to be forwarded; and
  - path metric information indicative of a characteristic required to be monitored as the data item traverses a portion of a path across the data network;
- updating means operable to update the fields carrying path metric information in respect of said data items in dependence on said characteristic as the data items traverse the network;
- forwarding means operable to forward said data items to one or more destinations outside said data network via said one or more egress nodes of said data network;
- target-specific path metric determining means operable to determine in respect of each of a plurality of data items the target information and the path metric information after the data item has traversed a portion of a path across the data network, and to derive in dependence on said determined path metric information and on said target information a target-specific path metric relating to the characteristic in respect of the portion of the path across the data network to the egress node via which the data item has been forwarded; and
- target-specific network metric determining means operable to combine target-specific path metrics derived in respect of a plurality of data items at least some of which are traversing different end-to-end paths in the event that said target-specific path metrics relate to characteristics in respect of data items having target information indicative of a common target, whereby to determine a target-specific network metric.

* * * * *